(12) United States Patent
Tkacik et al.

(10) Patent No.: US 7,975,307 B2
(45) Date of Patent: *Jul. 5, 2011

(54) SECURING PROPRIETARY FUNCTIONS FROM SCAN ACCESS

(75) Inventors: Thomas Tkacik, Phoenix, AZ (US); Amir Daneshbeh, Austin, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 950 days.

This patent is subject to a terminal disclaimer.

(21) Appl. No.: 11/851,778

(22) Filed: Sep. 7, 2007

(65) Prior Publication Data

US 2009/0070577 A1    Mar. 12, 2009

(51) Int. Cl.
*G06F 7/04* (2006.01)
(52) U.S. Cl. .......... 726/26; 714/724; 714/725; 714/726; 714/727
(58) Field of Classification Search .................... 726/26; 714/724–727
See application file for complete search history.

(56) References Cited

U.S. PATENT DOCUMENTS

| | | | | |
|---|---|---|---|---|
| 5,347,523 | A  * | 9/1994 | Khatri et al. ................... | 714/730 |
| 5,812,561 | A  * | 9/1998 | Giles et al. ..................... | 714/726 |
| 6,286,118 | B1 * | 9/2001 | Churchill et al. ............. | 714/726 |
| 6,539,511 | B1 * | 3/2003 | Hashizume ................... | 714/727 |
| 6,725,407 | B2 | 4/2004 | Richter et al. | |
| 6,754,862 | B1 * | 6/2004 | Hoyer et al. ................... | 714/725 |
| 7,185,249 | B2 * | 2/2007 | Tkacik et al. ................. | 714/726 |
| 7,228,440 | B1 * | 6/2007 | Giles et al. ..................... | 713/168 |
| 7,725,788 | B2 * | 5/2010 | Tkacik et al. ................. | 714/726 |
| 2003/0204801 | A1 | 10/2003 | Tkacik et al. | |
| 2003/0204802 | A1 | 10/2003 | Sim | |
| 2003/0206627 | A1 | 11/2003 | Penugonda et al. | |
| 2005/0039039 | A1 | 2/2005 | Moyer et al. | |
| 2005/0066189 | A1 * | 3/2005 | Moss et al. ..................... | 713/200 |
| 2005/0169076 | A1 | 8/2005 | Bancel et al. | |
| 2005/0193220 | A1 | 9/2005 | Little et al. | |
| 2008/0010570 | A1 * | 1/2008 | Yamazaki ...................... | 714/726 |

* cited by examiner

*Primary Examiner* — Nabil M El Hady
(74) *Attorney, Agent, or Firm* — Ingrassia Fisher & Lorenz, P.C.

(57) ABSTRACT

An electronic device as described herein implements a scheme to secure a data mapping function from scan access. The protection scheme can be used as a security measure for proprietary lookup tables, secret constants, digitally implemented algorithms, and the like. The electronic device employs a reconfigurable data mapping arrangement that can be reconfigured for a normal operating mode and a scan testing mode. While in the normal operating mode, a normal data mapping arrangement generates valid output data in accordance with the data mapping function. While in the scanning mode, however, a scanning data mapping arrangement generates invalid but testable output data in accordance with a data masking function that conceals, hides, masks, or obfuscates the data mapping function. Using the data masking function in this manner protects the data mapping function against reverse engineering attacks that attempt to derive the data mapping function from scan testing results.

17 Claims, 3 Drawing Sheets

SECURING PROPRIETARY FUNCTIONS FROM SCAN ACCESS

TECHNICAL FIELD

The disclosed subject matter relates generally to security techniques for scan testing of electronic devices. More particularly, the subject matter relates to a technique that secures data processing functions from reverse engineering attacks that rely on scan testing methodologies.

BACKGROUND

Electronic devices often include logic and associated structures to facilitate testing. For example, devices can configure internal flip flops, latches, or registers into chains, called scan chains, for purposes of testing. These scan chains typically include the flip flops, latches, and/or registers that are utilized to support the normal operating logic of the devices. An electronic device that processes digital data can be scan tested by clocking a known sequence of data through the scan chains. If the internal processing and logic of the electronic device are valid and error-free, then the device will generate expected output sequence(s) or vector(s) in response to the test scan patterns. Scan testing can be used to test internal structures and logic elements that would be otherwise inaccessible. Scan testing, however, gives rise to data access issues that must be taken into consideration, especially in light of the encryption and security requirements of the software, telecommunications, entertainment, and other industries.

The author of an encryption algorithm (or other secret or proprietary function) may want to keep the algorithm secret. Protected algorithms might also be used as part of other proprietary data processing methods, e.g., filtering, data compression, digital signal processing, digital rights management, or the like. For example, an algorithm that utilizes a proprietary digital mapping or conversion scheme may be implemented by a hardware-based or memory-based lookup table, where the contents of the table are protected by appropriate confidentiality agreements. In practice, electronic devices on semiconductor chips are often utilized to execute proprietary algorithms. However, if the circuitry responsible for handling the secure codes and implementing proprietary processing logic is accessible via scan testing, competitors might be able to exploit the scanning procedure and use reverse engineering techniques to gain access to the secure codes, algorithms, or logic stored in the chip.

BRIEF DESCRIPTION OF THE DRAWINGS

A more complete understanding of the disclosed subject matter may be derived by referring to the detailed description and claims when considered in conjunction with the following figures, wherein like reference numbers refer to similar elements throughout the figures.

DETAILED DESCRIPTION

The following detailed description is merely illustrative in nature and is not intended to limit the disclosed embodiments or the application and uses of such embodiments. Furthermore, there is no intention to be bound by any expressed or implied theory presented in the preceding technical field, background, brief summary or the following detailed description.

The subject matter may be described herein in terms of functional and/or logical block components and various processing steps. It should be appreciated that such block components may be realized by any number of hardware, software, and/or firmware components configured to perform the specified functions. For example, an embodiment may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that the embodiments may be practiced in conjunction with any number of data processing techniques and protocols, and that the electronic devices described herein are merely exemplary applications for the disclosed subject matter.

Figure 1:
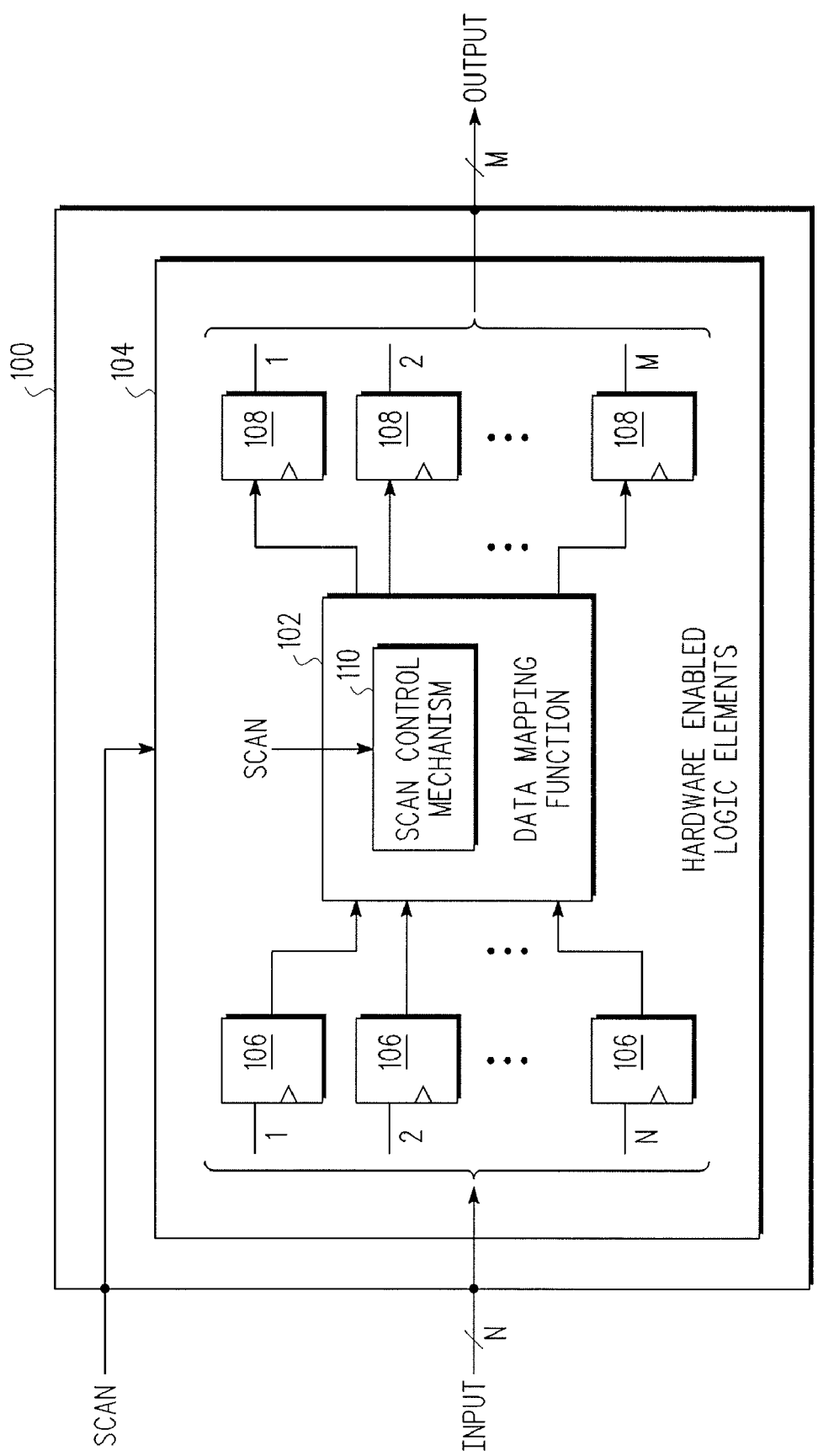
FIG. 1 is a schematic representation of an embodiment of an electronic device that is configured to execute a data mapping function.
Figure 3:
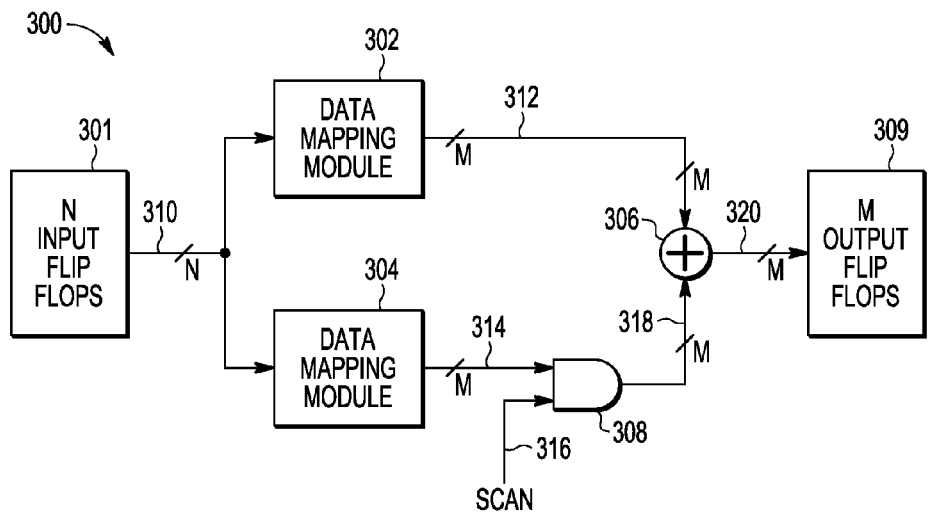
FIG. 3 is a schematic representation of a portion of an electronic device configured in accordance with one disclosed embodiment.
Figure 4:
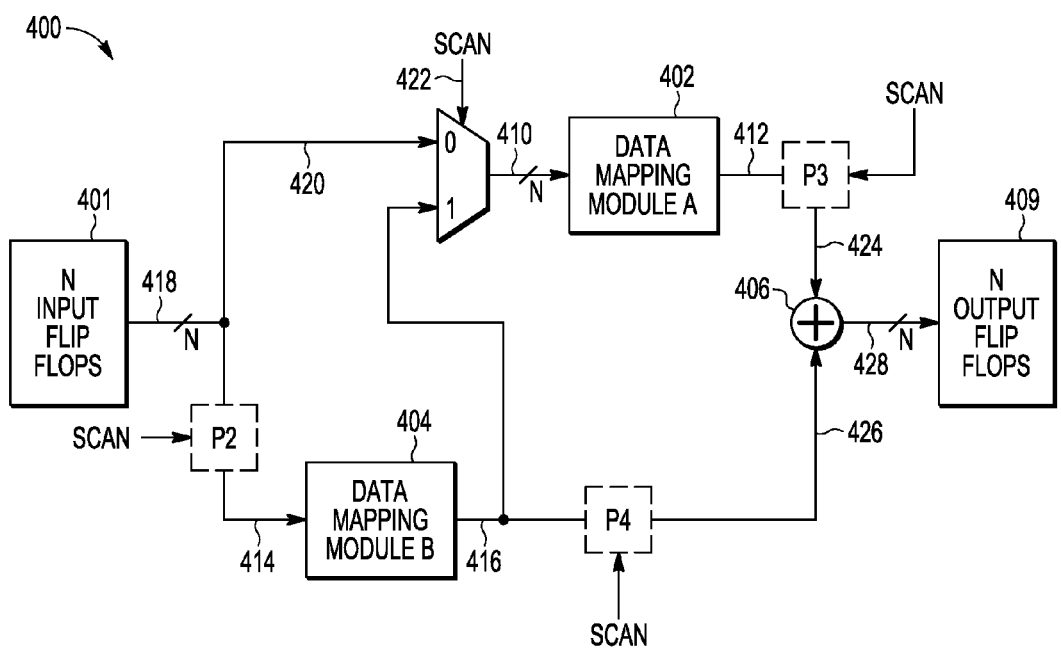
FIG. 4 is a schematic representation of a portion of an electronic device configured in accordance with another disclosed embodiment.

For the sake of brevity, conventional techniques related to integrated circuit device fabrication and design, digital logic gates and their hardware implementations, scan testing, digital data processing, and other functional aspects of the devices (and the individual operating components of the devices) may not be described in detail herein. Furthermore, the connecting lines shown in the various figures contained herein are intended to represent example functional relationships and/or physical couplings between the various elements. It should be noted that many alternative or additional functional relationships or physical connections may be present in a practical embodiment. Moreover, although the schematics shown in FIG. 1, FIG. 3, and FIG. 4 depict particular arrangements of elements, additional intervening elements, devices, features, or components may be present in an actual embodiment (assuming that the described functionality is not adversely affected).

The following description refers to nodes or features or elements being "connected" or "coupled" together. As used herein, unless expressly stated otherwise, "connected" means that one node/feature/element is directly coupled to another node/feature/element, and not necessarily mechanically. As used herein, unless expressly stated otherwise, "coupled" means that one node/feature/element is directly or indirectly connected to another node/feature/element, and not necessarily mechanically.

As used herein, a "data mapping function" is a combinatorial logic block which receives N bits as an input and, in response to the input, generates M bits as a corresponding output (where N and M are integers, typically greater than one, and where N and M may be the same number or a different number). In other words, a data mapping function converts, translates, or maps a digital input into a corresponding digital output. Although not a requirement, a data mapping function will usually generate a different digital output value from its respective digital input value. In practice, a data mapping function can be implemented with any structure, device or devices, memory, digital logic enabled in hardware, a lookup table, a digital data converter or translator, or other suitably configured hardware, software, and/or firmware.

The techniques and electronic devices described herein utilize reconfigurable functional device logic such that, during scan testing, a tested data mapping function (e.g., a logic function) does not provide any indication of the normal mode functionality, but still provides complete test coverage. The methodology is suitable for use when testing a secret algorithm, a data mapping function, a proprietary conversion table, or the like, where the protected function is realized in logic gates and/or a memory structure. The methodology can be utilized to protect proprietary functions from physical attack via reverse engineering of scan tested output vectors. The secure technique described herein prevents recovery of proprietary functions (e.g., secret table contents, proprietary mapping constants, and logic implemented algorithms) from scan test output.

Some encryption, compression, filtering, digital rights management, and data communication applications require the hiding of data that may be stored in read only memory or implemented in logic gates, or require the hiding of a secret data mapping function. Generally, a data mapping function can be represented as $y=f(x)$, where x is the input to the function (or lookup table), y is the output, and it is desired to keep the function secret, concealed, or hidden. In practice, such a data mapping function can be embedded within the device such that the input and output of the function is nether controllable nor observable. Thus, during normal device operation the function is protected because its input and output values are not accessible. However, it might be possible to reverse engineer this function using scan testing techniques by exhaustively providing all inputs x to the function, and observing all of the corresponding outputs y. This type of reverse engineering can be prevented by outputting a different set of outputs y' during scan testing.

As described in more detail below, an electronic device having a protected function employs two versions of a corresponding logic function or data table (implemented as read only memory or as hardware in the form of logic gates). In a normal operating mode, a first arrangement of elements is used to give an expected and correct functional output associated with a data mapping function. During scan testing, however, a second arrangement of elements is used to carry out a different function that intentionally generates a test output that is not correlated to the correct functional output. This scanning mode function is used during scan testing to provide a suitable test scan output without providing information about the underlying protected data mapping function. In other words, the test scan output cannot be analyzed or reverse engineered to obtain information about the protected data mapping function.

FIG. 1 is a schematic representation of an embodiment of an electronic device 100 that is configured to execute a data mapping function 102 during a normal operating mode. Electronic device 100 is preferably realized as an integrated circuit device that is fabricated using conventional semiconductor manufacturing processes. Electronic device 100 is depicted in an oversimplified manner for ease of description. Electronic device 100 receives digital inputs at one or more input ports or pins, processes the digital inputs, and generates corresponding digital outputs at one or more output ports or pins, where the digital outputs are generated in response to the respective digital inputs. In practice, the digital input may be an N-bit input, and the digital output may be an M-bit output, where N and M can be the same or different numbers (for the embodiments described here, N and M may be equal).

Electronic device 100 includes a number of hardware enabled logic elements 104 that are suitably configured to perform various digital data processing functions, digital logic functions, data storage and transmission functions, and the like. Such hardware enabled logic elements 104 may include, without limitation: flip flops; latches; inverters; registers; multiplexers; logical gates; or the like. For the sake of simplicity, most of the individual logic devices and circuit connections are not depicted in FIG. 1. For this embodiment, hardware enabled logic elements 104 include N input flip flops 106 and M output flip flops 108. As depicted in FIG. 1, each input flip flop 106 corresponds to one bit of the N-bit input, and each output flip flop 108 corresponds to one bit of the M-bit output. During the normal operating mode, input flip flops 106 and output flip flops are configured to function as input and output registers, respectively. During the scan mode, input flip flops 106 and output flip flops 108 are configured to accommodate scan testing.

Electronic device 100 may also be configured to receive a configuration signal (labeled "SCAN" in FIG. 1) at one or more input ports or pins. The configuration signal is utilized to initiate scan testing of electronic device 100 and, in particular, scan testing of data mapping function 102 in an indirect manner that verifies the operation of data mapping function 102 without revealing its actual underlying function or algorithm. For this embodiment, the configuration signal is a logic signal where a logic high value designates a scanning mode for electronic device 100 and where a logic low value designates a normal operating mode for electronic device 100. In practice, the configuration signal causes hardware enabled logic elements 104 to be rearranged into one or more scan chains that are used for scan testing. The configuration signal also controls a reconfigurable data mapping arrangement of electronic device 100. For this particular embodiment, the reconfigurable data mapping arrangement is realized in hardware enabled logic elements 104 of electronic device 100. In this regard, electronic device 100 employs a suitably configured scan control mechanism 110 that responds to the SCAN configuration signal in a manner such that electronic device 100 can operate in either the normal operating mode or the scanning mode. In practice, scan control mechanism 110 may be realized as one or more hardware enabled elements 104.

For this example, data mapping function 102 represents a secret, proprietary, or confidential function. In other words, the underlying logic or algorithm for data mapping function 102 is not to be disclosed or made readily accessible. Depending upon the implementation of electronic device 100, data mapping function 102 may be realized as read only memory and/or as a number of combinatorial logic gates with no scanable registers (i.e., as a hardware enabled logic function). FIG. 1 depicts an embodiment where data mapping function 102 is carried out by hardware enabled logic elements 104.

The SCAN configuration signal governs the operation of a suitably configured scan control mechanism 110 for electronic device 100. The control mechanism 110 changes the reconfigurable data mapping arrangement of electronic device 100 into the normal data mapping arrangement for operation in the normal operating mode, and into the scanning data mapping arrangement for operation in the scanning mode. It also configures registers for scan testing. For the embodiment illustrated in FIG. 1, the scan control mechanism 1 10 arranges at least a portion of hardware enabled logic elements 104 into the normal data mapping arrangement. While in the normal operating mode, electronic device 100 employs the normal data mapping arrangement to carry out data mapping function 102. Consequently, during the normal operating mode electronic device 100 generates the digital output in the expected manner using data mapping function 102 (thus, the digital output of electronic device 100 is generated in accordance with data mapping function 102).

While in the scanning mode, electronic device 100 employs the scanning data mapping arrangement instead of the normal data mapping arrangement. For the embodiment illustrated in FIG. 1, the scan control mechanism 110 arranges at least a portion of hardware enabled logic elements 104 into the scanning data mapping arrangement. While in the scanning mode, electronic device 100 employs the scanning data mapping arrangement to carry out a data masking function. The scanning data mapping arrangement is configured to receive digital scan inputs and, in response to the digital scan inputs, generate respective digital scan outputs. The digital scan outputs are generated in accordance with the data masking function, which protects data mapping function 102 from scan access while still allowing scan testing of electronic device 100. In particular, this enables scan testing of the hardware enabled logic elements 104 that are also utilized to perform data mapping function 102. As used herein, "scan access" refers to information being obtained, derived, or calculated from scan testing results. In the context of electronic device 100, use of the scanning data mapping arrangement results in data mapping function 102 being masked, hidden, concealed, obfuscated, or otherwise immune to reverse engineering by examination of the scan testing results.

Figure 2:
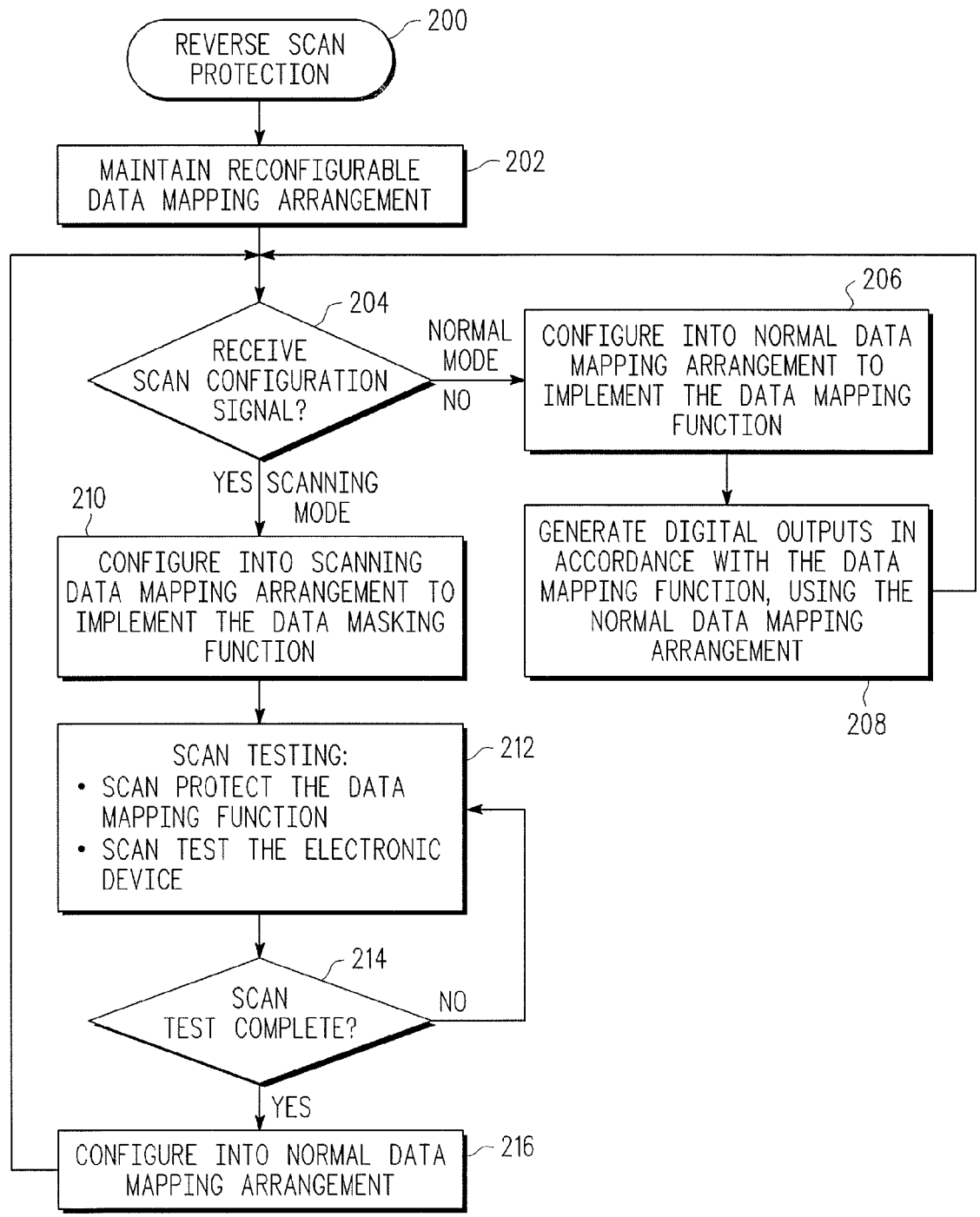
FIG. 2 is a flow chart that illustrates an embodiment of a scan protection process that can be used to secure a data mapping function from scan access.

FIG. 2 is a flow chart that illustrates an embodiment of a scan protection process 200 that can be used to secure a data mapping function from scan access. The various tasks performed in connection with process 200 may be performed by software, hardware, firmware, or any combination thereof. For illustrative purposes, the following description of process 200 may refer to elements mentioned above in connection with FIG. 1. It should be appreciated that process 200 may include any number of additional or alternative tasks, the tasks shown in FIG. 2 need not be performed in the illustrated order, and process 200 may be incorporated into a more comprehensive procedure or process having additional functionality not described in detail herein.

In connection with process 200, the host electronic device maintains a reconfigurable data mapping arrangement as generally described above (task 202). If the electronic device receives an appropriate scan configuration signal, then the electronic device will enter a scanning mode. Alternatively, if the electronic device receives an appropriate normal configuration signal, then the electronic device will enter a normal operating mode (query task 204). In connection with the normal operating mode, process 200 configures or switches the reconfigurable data mapping arrangement into the normal data mapping arrangement to implement the data mapping function (task 206). In the normal operating mode, the normal mapping arrangement generates digital outputs from respective digital inputs, where the digital outputs are generated in accordance with the data mapping function (task 208). In turn, the digital outputs from the normal mapping arrangement may be further processed before the electronic device generates its corresponding device outputs. FIG. 2 depicts task 208 leading back to query task 204 to indicate that the electronic device will remain in the normal operating mode until it receives a scan configuration signal.

Receiving a scan configuration signal initiates scan testing of the electronic device. In response to the scan configuration signal, the electronic device enters the scanning mode and process 200 configures or switches the reconfigurable data mapping arrangement into the scanning data mapping arrangement to implement the data masking function (task 210). Depending upon the current state of the electronic device, the scan configuration signal may initiate the reconfiguration of the normal data mapping arrangement into the scanning data mapping arrangement. As mentioned above, the scanning data mapping arrangement is suitably configured to scan protect the data mapping function while allowing scan testing of the electronic device. In the scanning mode, the scanning data mapping arrangement generates digital outputs from respective digital inputs, where the digital outputs are generated in accordance with the data masking function. In certain embodiments, the data masking function alters, replaces, or supplements the data mapping function. In some embodiments, the data masking function is influenced by the data mapping function, i.e., the normal output of the data mapping function may be further manipulated and processed by a data masking function that incorporates or integrates the data mapping function.

Once the scanning data mapping arrangement has been configured, process 200 can proceed with scan testing (task 212). In this regard, process 200 performs scan testing of at least a portion of the electronic device and, in particular, scan testing of the scanning data mapping arrangement. In practice, scan testing the scanning data mapping arrangement also scan tests the elements/components of the electronic device that are responsible for carrying out the data mapping function. In other words, scan testing the scanning data mapping arrangement effectively scan tests the elements/components of the normal data mapping arrangement. During task 212 process 200 scan protects the data mapping function by concealing, masking, obscuring, or hiding the underlying logic, protocol, and/or algorithm utilized by the data mapping function in a manner that prevents access via reverse engineering of the scan testing output.

Upon completion of scan testing (query task 214), process 200 may cause the electronic device to revert back to the normal data mapping arrangement (task 216). During task 216, the configuration signal is switched to indicate the normal configuration value, and the reconfigurable data mapping arrangement is reconfigured into the normal data mapping arrangement. FIG. 2 depicts task 216 leading back to query task 204 to indicate that the electronic device will remain in the normal operating mode until it receives a scan configuration signal.

As described above, a reconfigurable data mapping arrangement can be implemented using different techniques and technologies. Certain electronic device embodiments implement the reconfigurable data mapping arrangement with hardware enabled digital logic. For example, FIG. 3 is a schematic representation of a portion of an electronic device 300 configured in accordance with one disclosed embodiment.

Electronic device 300 includes, without limitation: an input register 301 (e.g., N input flip flops), a data mapping module 302, a data mapping module 304 (that performs a data masking function), a combining module 306 coupled to module 302 and to module 304, a control mechanism 308, and an output register (e.g., M output flip flops). For this embodiment, module 302 is configured to receive an N-bit digital input 310 and, in response thereto, generate an M-bit digital output 312. For example, module 302 might be an 8-bit lookup table having 256 entries corresponding to the 256 possible 8-bit digital inputs. Notably, module 302 carries out a desired data mapping function on digital input 310, and the goal is to protect this data mapping function during scan testing. For this embodiment, module 304 is configured to receive the same digital input 310 and, in response thereto, generate an M-bit digital output 314. For example, module 304 might be a different 8-bit lookup table having 256 entries corresponding to the 256 possible 8-bit digital inputs. Module 304 is suitably configured to carry out a data masking function on digital input 310. In practice, module 304 implements a random and/or uncorrelated function relative to the protected data mapping function, such that no knowledge or information about the protected data mapping function can be extracted or derived from scan testing of electronic device 300.

FIG. 3 depicts control mechanism 308 as an AND gate because control mechanism 308 performs an AND operation on digital output 314 and a configuration signal 316. For the illustrated embodiment, a logic high value of configuration signal 316 is maintained during the scanning mode, while a logic low value of configuration signal 316 is maintained during the normal operating mode. When configuration signal 316 is a logic low value, control mechanism 308 generates an M-bit digital output 318 having all zeros. In other words, during the normal operating mode control mechanism 308 provides a zero valued input to combining module 306. When configuration signal 316 is a logic high value, however, digital output 318 corresponds to digital output 314. In other words, during the scanning mode control mechanism 308 passes M-bit digital output 314 to combining module 306.

FIG. 3 depicts combining module 306 as an XOR gate because combining module 306 performs an XOR operation on digital output 312 (provided by data mapping module 302) and digital output 318 (provided by control mechanism 308). Alternatively, combining module 306 can be suitably configured to perform other digital processing operations on digital output 312 and digital output 318 to generate its digital output 320. When electronic device 300 is in the normal operating mode (i.e., when digital output 318 is held at a zero value), digital output 320 corresponds to digital output 312. Accordingly, during the normal operating mode second data mapping module 304 is effectively disabled. In other words, during the normal operating mode combining module 306 outputs the M-bit digital output 312, which reflects processing by data mapping module 302 and, therefore, execution of the protected data mapping function. When electronic device 300 is in the scanning mode (i.e., when digital output 318 represents digital output 314 generated by data mapping module 304), digital output 320 represents a digital scan output that is influenced by digital output 312 and by digital output 318. Thus, during scan testing digital output 320 is an M-bit representation of M-bit digital output 312 and M-bit digital output 318 subjected to an XOR operation.

Electronic device 300 manipulates the reconfigurable data mapping arrangement as needed to maintain either a normal data mapping arrangement or a scanning data mapping arrangement. In this regard, the normal data mapping arrangement effectively includes only data mapping module 302 due to the "disabling" of data mapping module 304 during the normal operating mode. The scanning data mapping arrangement, however, includes data mapping module 302, data mapping module 304, and combining module 306. During the normal operating mode, input register 301 and output register 309 function to accommodate the normal N-bit input and the normal M-bit output. In contrast, during the scanning mode, the flip flops of input register 301 and the flip flops of output register 309 are arranged into one or more scan chains.

As another example, FIG. 4 is a schematic representation of a portion of an electronic device 400 configured in accordance with another disclosed embodiment. Electronic device 400 generally includes, without limitation: an input register 401 (e.g., N input flip flops), a data mapping module 402, a data mapping module 404, a combining module 406 coupled to module 402 and to module 404, a control mechanism 408, and an output register 409 (e.g., N output flip flops). Electronic device 400 may also include a number of optional permutation modules (labeled P2, P3, and P4 in FIG. 4). For this example, a permutation module is active during the scanning mode and inactive (i.e., it serves as a pass-through element) during the normal operating mode. For ease of description, electronic device 400 will initially be described with the assumption that these permutation modules do not exist.

For this embodiment, module 402 is configured to receive an N-bit digital input 410 and, in response thereto, generate an N-bit digital output 412. For example, module 402 might be an 8-bit lookup table having 256 entries corresponding to the 256 possible 8-bit digital inputs. Notably, module 402 carries out a data masking function on digital input 410. Similarly, module 404 is configured to receive an N-bit digital input 414 and, in response thereto, generate an N-bit digital output 416, where each of the $2^N$ different N-bit inputs 414 generates a different N-bit output 416. Module 404 thus implements a permutation function. For example, module 404 might be a different 8-bit lookup table having 256 entries corresponding to the 256 possible 8-bit digital inputs. Module 402 is suitably configured to carry out a data masking function on digital input 414. In a version of electronic device 400 that does not use permutation module P2 (or when permutation module P2 is inactive), digital input 414 corresponds to the overall N-bit digital input 418. In a version of electronic device 400 that includes permutation module P2, digital input 414 will be a translated, mapped, altered, or permutated representation of digital input 418 when permutation module P2 is active. Permutation module P2 might implement a simple function such as rotation of the input bits, pairwise swapping of input bits, or inversion of some input bits. In contrast to electronic device 300, neither data mapping module 402 nor data mapping module 404 alone carries out the secret data mapping function that is used during normal device operation. Consequently, each of the two modules 402/404 preferably implements a different random and/or uncorrelated function relative to the protected data mapping function, such that no knowledge or information about the protected data mapping function can be extracted or derived from scan testing of electronic device 400.

FIG. 4 depicts control mechanism 408 as a multiplexer because control mechanism 408 performs a multiplexing operation. Here, control mechanism 408 receives digital output 416 (provided by data mapping module 404) and an N-bit digital input 420. Digital input 420 corresponds to the overall N-bit digital input 418. Alternatively, digital input 420 could be a translated, mapped, altered, or permutated representation of digital input 418. Control mechanism 408 also receives a configuration signal 422 and, in response thereto, selects either digital output 416 or digital input 420 for use as N-bit digital input 410. For the illustrated embodiment, a logic high value of configuration signal 422 is maintained during the scanning mode, while a logic low value of configuration signal 422 is maintained during the normal operating mode. When configuration signal 422 is a logic low value, control mechanism 408 selects digital input 420 for use as digital input 410. In contrast, when configuration signal 422 is a logic high value, control mechanism 408 selects digital output 416 for use as digital input 410.

FIG. 4 depicts combining module 406 as an XOR gate because combining module 406 performs an XOR operation on its respective digital inputs. Alternatively, combining module 406 can be suitably configured to perform any digital processing operation on its respective digital inputs to generate the overall N-bit digital output 428 as a combined output that is influenced by the respective outputs of the data mapping modules 402/404. Here, combining module 406 receives two N-bit digital inputs 424/426. In a version of electronic device 400 that does not use permutation module P3 (or when permutation module P3 is inactive), digital input 424 corresponds to the N-bit digital output 412 provided by data mapping module 402. In a version of electronic device 400 that includes permutation module P3, digital input 424 will be a translated, mapped, altered, or permutated representation of digital output 412 when permutation module P3 is active. Likewise, in a version of electronic device 400 that does not use permutation module P4 (or when permutation module P4 is inactive), digital input 426 corresponds to the N-bit digital output 416 provided by data mapping module 404. In a version of electronic device 400 that includes permutation module P4, digital input 426 will be a translated, mapped, altered, or permutated representation of digital output 416 when permutation module P4 is active.

When electronic device 400 is in the normal operating mode (i.e., when digital input 420 serves as the input to data mapping module 402), digital input 424 represents the digital input 418 as processed by data mapping module 402, and digital input 426 represents the digital input 418 as processed by data mapping module 404. Notably, during the normal operating mode the overall "combined" N-bit output signal 428 is generated from digital input 418 in accordance with the secret data mapping function. Using a priori knowledge of the secret data mapping function, the data masking functions implemented by data mapping modules 402/404 can be designed in a manner that generates the secret data mapping function. Mapping module 404 could be generated as a random permutation (i.e., each of the $2^N$ N-bit inputs generates a different N-bit output). Then, the function of mapping module 402 is generated for each N-bit input, by XOR-ing the desired data mapping function value 428 for that input with the output 416 of mapping module 404.

When electronic device 400 is in the scanning mode (i.e., when digital output 416 from data mapping module 404 servers as the input to data mapping module 402), digital input 424 represents the digital input 418 as processed by both data mapping modules 402/404 in series, and digital input 426 represents the digital input 418 as processed by data mapping module 404 alone. Notably, during the scanning mode the overall "combined" N-bit output signal 428 is generated from digital input 418 in accordance with a particular data masking function that effectively masks, hides, or conceals the secret data mapping function. 39 During the normal operating mode, input register 401 and output register 409 function to accommodate the normal N-bit input and the normal N-bit output. In contrast, during the scanning mode, the flip flops of input register 401 and the flip flops of output register 409 are arranged into one or more scan chains. Electronic device 400 manipulates the reconfigurable data mapping arrangement as needed to maintain either a normal data mapping arrangement or a scanning data mapping arrangement. In this regard, the normal data mapping arrangement includes data mapping module 402 and data mapping module 404 in a first combined arrangement (e.g., a parallel configuration), with combining module 406 performing an XOR operation on the digital outputs of the modules 402/404. Thus, this first combined arrangement is suitably configured to carry out the secret data mapping function for the normal operating mode, during which valid device output data is generated. The scanning data mapping arrangement, however, includes data mapping module 402 and data mapping module 404 in a second and different combined arrangement (e.g., a series configuration), with combining module 406 performing an XOR operation on the digital output of module 404 and a digital output that results from processing by both modules 402/404. Thus, this second combined arrangement is suitably configured to carry out the data masking function for the scanning mode, during which invalid but testable device output data is generated.

One or more permutation modules may also be utilized by electronic device 400 to add additional security. A permutation module can be generally considered to be another data mapping module that alters its digital input to generate a respective digital output. An inverter is one example of a simple permutation module. Input bit rotation or pairwise bit swapping are examples of other simple permutation modules. In practice, a permutation module could be realized using a bit rewiring scheme. For electronic device 400, configuration signal 422 could also be used to enable/disable the permutation modules as desired for the normal operating mode and/or the scanning mode.

In summary, systems, devices, and methods configured in accordance with example embodiments of the invention relate to:

A method of securing a data mapping function in an electronic device that employs a normal data mapping arrangement to carry out the data mapping function during a normal operating mode. This method comprises: receiving a configuration signal to initiate scan testing; and in response to the configuration signal, reconfiguring the normal data mapping arrangement into a scanning data mapping arrangement for a scanning mode, the scanning data mapping arrangement being configured to scan protect the data mapping function while allowing scan testing of the electronic device. This method may further comprise scan testing at least a portion of the electronic device. Scan testing at least a portion of the electronic device may comprise scan testing the scanning data mapping arrangement. This method may further comprise reverting to the normal data mapping arrangement at completion of scan testing. This method may further comprise: in the normal operating mode, generating first digital outputs from respective digital inputs using the normal data mapping arrangement, the first digital outputs being generated in accordance with the data mapping function; and in the scanning mode, generating second digital outputs from respective digital inputs using the scanning data mapping arrangement, the second digital outputs being generated in accordance with a data masking function that alters the data mapping function. In this method, the normal data mapping arrangement may comprise a first data mapping module and a second data mapping module in a first combined arrangement that is configured to carry out the data mapping function during the normal operating mode, and reconfiguring the normal data mapping arrangement into the scanning data mapping arrangement may comprise arranging the first data mapping module and the second data mapping module in a second combined arrangement that is configured to carry out a data masking function during the scanning mode. This method may further comprise: in the normal operating mode, generating first digital outputs from respective digital inputs using the first combined arrangement, the first digital outputs being generated in accordance with the data mapping function; and in the scanning mode, generating second digital outputs from respective digital inputs using the second combined arrangement, the second digital outputs being generated in accordance with the data masking function.

In an electronic device configured to generate digital outputs from respective digital inputs in accordance with a data mapping function, a method of securing the data mapping function from scan access. The method comprises: in a normal operating mode of the electronic device, implementing the data mapping function with a normal data mapping arrangement; and in a scanning mode of the electronic device: implementing a data masking function with a scanning data mapping arrangement; and scan protecting the data mapping function with the data masking function while allowing scan testing of the electronic device. This method may further comprise: receiving a configuration signal to initiate scan testing of the electronic device; and in response to the configuration signal, reconfiguring the normal data mapping arrangement into the scanning data mapping arrangement. This method may further comprise scan testing at least a portion of the electronic device. Scan testing at least a portion of the electronic device may comprise scan testing the scanning data mapping arrangement. This method may further comprise reverting to the normal data mapping arrangement at completion of scan testing. This method may further comprise: in the normal operating mode, generating first digital outputs from respective digital inputs using the normal data mapping arrangement, the first digital outputs being generated in accordance with the data mapping function; and in the scanning mode, generating second digital outputs from respective digital inputs using the scanning data mapping arrangement, the second digital outputs being generated in accordance with the data masking function. In one embodiment, the data masking function is influenced by the data mapping function. In this method, implementing the data mapping function may comprise implementing a first data mapping module and a second data mapping module in a first combined arrangement that is configured to carry out the data mapping function during the normal operating mode; and implementing the data masking function may comprise arranging the first data mapping module and the second data mapping module in a second combined arrangement that is configured to carry out the data masking function during the scanning mode.

An electronic device comprising a reconfigurable data mapping arrangement and a control mechanism for the reconfigurable data mapping arrangement, where the control mechanism is controllable to arrange the reconfigurable data mapping arrangement into a normal data mapping arrangement for a normal operating mode, and to arrange the reconfigurable data mapping arrangement into a scanning data mapping arrangement for a scanning mode. In the normal operating mode, the normal data mapping arrangement is configured to receive digital inputs and generate respective digital outputs in accordance with a data mapping function. In the scanning mode, the scanning data mapping arrangement is configured to receive digital scan inputs and generate respective digital scan outputs in accordance with a data masking function that protects the data mapping function from scan access while allowing scan testing of the electronic device. The reconfigurable data mapping arrangement may comprise: a first data mapping module configured to receive a digital input, and to carry out the data mapping function on the digital input, resulting in a first digital output; a second data mapping module configured to receive the digital input, and to generate a second digital output in response to the digital input; and a combining module coupled to the first data mapping module and the second data mapping module, the combining module being configured to output the first digital output during the normal operating mode, and to output a digital scan output during the scanning mode, the digital scan output being influenced by the first digital output and the second digital output. The reconfigurable data mapping arrangement may comprise: a first data mapping module configured to generate a first digital output in response to its respective digital input; a second data mapping module configured to generate a second digital output in response to its respective digital input; and a combining module coupled to the first data mapping module and to the second data mapping module, the combining module being configured to generate a combined output that is influenced by the first digital output and the second digital output. For one embodiment, in the normal operating mode, the combining module generates the combined output in accordance with the data mapping function; and in the scanning mode, the combining module generates the combined output in accordance with the data masking function. In certain embodiments, the reconfigurable data mapping arrangement is configured to perform data encryption.

While at least one example embodiment has been presented in the foregoing detailed description, it should be appreciated that a vast number of variations exist. It should also be appreciated that the example embodiment or embodiments described herein are not intended to limit the scope, applicability, or configuration of the invention in any way. Rather, the foregoing detailed description will provide those skilled in the art with a convenient road map for implementing the described embodiment or embodiments. It should be understood that various changes can be made in the function and arrangement of elements without departing from the scope of the invention as set forth in the appended claims and the legal equivalents thereof.

What is claimed is:

1. A method of securing a data mapping function in an electronic device that employs a normal data mapping arrangement to carry out the data mapping function during a normal operating mode, wherein the normal data mapping arrangement comprises a first data mapping module and a second data mapping module in a first combined arrangement that is configured to carry out the data mapping function during the normal operating mode, the method comprising:
   receiving a configuration signal to initiate scan testing; and
   in response to the configuration signal, reconfiguring the normal data mapping arrangement into a scanning data mapping arrangement for a scanning mode by arranging the first data mapping module and the second data mapping module in a second combined arrangement that is configured to carry out a data masking function during the scanning mode, the scanning data mapping arrangement being configured to scan protect the data mapping function while allowing scan testing of the electronic device.

2. The method of claim 1, further comprising scan testing at least a portion of the electronic device.

3. The method of claim 2, wherein scan testing at least a portion of the electronic device comprises scan testing the scanning data mapping arrangement.

4. The method of claim 2, further comprising reverting to the normal data mapping arrangement at completion of scan testing.

5. The method of claim 1, further comprising:
   in the normal operating mode, generating first digital outputs from respective digital inputs using the normal data mapping arrangement, the first digital outputs being generated in accordance with the data mapping function; and
   in the scanning mode, generating second digital outputs from respective digital inputs using the scanning data mapping arrangement, the second digital outputs being generated in accordance with a data masking function that alters the data mapping function.

6. The method of claim 1, further comprising:
in the normal operating mode, generating first digital outputs from respective digital inputs using the first combined arrangement, the first digital outputs being generated in accordance with the data mapping function; and
in the scanning mode, generating second digital outputs from respective digital inputs using the second combined arrangement, the second digital outputs being generated in accordance with the data masking function.

7. In an electronic device configured to generate digital outputs from respective digital inputs in accordance with a data mapping function, a method of securing the data mapping function from scan access, the method comprising:
in a normal operating mode of the electronic device, implementing the data mapping function with a normal data mapping arrangement by implementing a first data mapping module and a second data mapping module in a first combined arrangement that is configured to carry out the data mapping function during the normal operating mode; and
in a scanning mode of the electronic device:
implementing a data masking function with a scanning data mapping arrangement by arranging the first data mapping module and the second data mapping module in a second combined arrangement that is configured to carry out the data masking function during the scanning mode; and
scan protecting the data mapping function with the data masking function while allowing scan testing of the electronic device.

8. The method of claim 7, further comprising:
receiving a configuration signal to initiate scan testing of the electronic device; and
in response to the configuration signal, reconfiguring the normal data mapping arrangement into the scanning data mapping arrangement.

9. The method of claim 8, further comprising scan testing at least a portion of the electronic device.

10. The method of claim 9, wherein scan testing at least a portion of the electronic device comprises scan testing the scanning data mapping arrangement.

11. The method of claim 9, further comprising reverting to the normal data mapping arrangement at completion of scan testing.

12. The method of claim 7, further comprising:
in the normal operating mode, generating first digital outputs from respective digital inputs using the normal data mapping arrangement, the first digital outputs being generated in accordance with the data mapping function; and
in the scanning mode, generating second digital outputs from respective digital inputs using the scanning data mapping arrangement, the second digital outputs being generated in accordance with the data masking function.

13. The method of claim 12, wherein the data masking function is influenced by the data mapping function.

14. An electronic device comprising:
a reconfigurable data mapping module, comprising:
a first data mapping module comprising first hardware-based logic elements configured to receive a digital input, and to carry out a data mapping function on the digital input, resulting in a first digital output; and
a second data mapping module comprising second hardware-based logic elements configured to receive the digital input, and to generate a second digital output in response to the digital input; and
a combining module coupled to the first data mapping module and the second data mapping module, the combining module being configured to output the first digital output during the normal operating mode, and to output a digital scan output during the scanning mode, the digital scan output being influenced by the first digital output and the second digital output; and
a control module that controls the reconfigurable data mapping module, the control module being controllable to arrange the reconfigurable data mapping module into a normal data mapping arrangement for a normal operating mode, and to arrange the reconfigurable data mapping module into a scanning data mapping arrangement for a scanning mode;
in the normal operating mode, the normal data mapping arrangement being configured to receive digital inputs and generate respective digital outputs in accordance with a data mapping function; and
in the scanning mode, the scanning data mapping arrangement being configured to receive digital scan inputs and generate respective digital scan outputs in accordance with a data masking function that protects the data mapping function from scan access while allowing scan testing of the electronic device.

15. An electronic device, comprising:
a reconfigurable data mapping module, comprising:
a first data mapping module comprising first hardware-based logic elements configured to generate a first digital output in response to its respective digital input; and
a second data mapping module comprising second hardware-based logic elements configured to generate a second digital output in response to its respective digital input; and
a combining module coupled to the first data mapping module and to the second data mapping module, the combining module being configured to generate a combined output that is influenced by the first digital output and the second digital output; and
a control module that controls the reconfigurable data mapping module, the control module being controllable to arrange the reconfigurable data mapping module into:
a normal data mapping arrangement during a normal operating mode, the normal data mapping arrangement being configured to receive digital inputs and generate respective digital outputs in accordance with a data mapping function; or
a scanning data mapping arrangement during a scanning mode, the scanning data mapping arrangement being configured to receive digital scan inputs and generate respective digital scan outputs in accordance with a data masking function that protects the data mapping function from scan access while allowing scan testing of the electronic device.

16. The electronic device of claim 15, wherein:
in the normal operating mode, the combining module generates the combined output in accordance with the data mapping function; and
in the scanning mode, the combining module generates the combined output in accordance with the data masking function.

17. The electronic device of claim 15, wherein the reconfigurable data mapping arrangement is configured to perform data encryption.

* * * * *